United States Patent

[11] 3,588,326

[72] Inventor Hugh F. Frohbach
Sunnyvale, Calif.
[21] Appl. No. 798,678
[22] Filed Feb. 12, 1969
[45] Patented June 28, 1971
[73] Assignee RCA Corporation of America

[54] LENS ARRAY IMAGING SYSTEM FOR A COLOR ENCODING CAMERA
5 Claims, 4 Drawing Figs.

[52] U.S. Cl. .......... 178/5.4ST
[51] Int. Cl. .......... H04n 9/06
[50] Field of Search .......... 178/5.4 (STC), 5.2, 5.4

[56] References Cited

UNITED STATES PATENTS

| | | | |
|---|---|---|---|
| 2,479,820 | 8/1949 | De Vore | 178/5.2 |
| 2,696,520 | 12/1954 | Bradley | 178/5.4STC |
| 2,733,291 | 1/1956 | Kell | 178/5.4STC |
| 3,378,633 | 4/1968 | Macovski | 178/5.4STC |
| 3,502,799 | 3/1970 | Watanabe | 178/5.4STC |

*Primary Examiner*—Richard Murray
*Assistant Examiner*—John C. Martin
*Attorney*—Eugene M. Whitacre

ABSTRACT: In a color encoding camera utilizing a color encoding strip filter arrangement in the optical path to separate light from an object into its component colors, an imaging arrangement including a lens array is utilized to image the encoding filter strips onto a photosensitive medium without the use of a relay lens.

INVENTOR
HUGH F. FROHBACH

BY Eugene M. Whitacre
ATTORNEY

LENS ARRAY IMAGING SYSTEM FOR A COLOR ENCODING CAMERA

BACKGROUND OF THE INVENTION

This invention relates to color encoding cameras, and more particularly, to an imaging system for imaging color encoding filter strips onto a photosensitive medium.

It is known in the art that a color encoding filter may be placed in the optical path of a camera to encode the light from an object in terms of component colors, which encoded light may then be recorded on black-and-white film for subsequent decoding to reproduce the object in color or which encoded light may be imaged onto the photosensitive element of a television camera pickup tube for televising a scene and for subsequent reproduction of the scene in color in a television receiver.

The color encoding filter may comprise a grating of alternate and parallel transparent and colored strips of a first color and a second grating superimposed over the first and comprising alternate and parallel transparent and colored strips of a second color. The colored strips may be red and blue for example, or be of subtractive primary colors such as cyan and yellow, for example. The latter type is more efficient from a point of view of overall light transmission and in that the entire filter area may be used for color encoding as well as luminance or brightness signal transmission.

A color encoding filter utilizing subtractive primary color strips may be of the type described in U.S. Pat. No. 3,378,633 to Albert Macovski. The filter described by Macovski comprises a first grating of transparent and cyan strips and a second grating of transparent and yellow strips superimposed over the first grating with the first and second gratings angularly disposed 45° from each other. The spacing of the strips in each grating is the same. With the line density of the gratings being in the order of 500 strip pairs per inch (a strip pair consisting of one colored and one transparent strip) imaged onto a one-half inch wide photosensitive surface of an image pickup tube, the cyan and transparent grating being disposed perpendicular to the direction of the scanning lines of the pickup tube in a television camera, and the yellow and transparent grating lines being disposed 45° from the direction of the scanning lines, amplitude-modulated carrier waves having fundamental frequencies of 5.0 MHz. and 3.5 MHz. for the red and blue color representative signals respectively, are derived at the output of the pickup tube. The luminance or brightness information is contained in the average signal derived from light transmitted by the encoding filter onto the photosensitive element of the pickup tube. The electrical signal from the pickup tube is processed to develop the separate luminance, R–Y and B–Y signals. In a color television camera a color encoding filter of the type described above may be placed in front of the pickup tube adjacent the faceplate. The light from a subject or scene to be televised is filtered by the color encoding filter and then impinges upon the photosensitive element of the camera pickup tube after passing through the glass faceplate of the tube. The pickup tube may be a vidicon, for example. It is desirable that the encoding filter strip pattern be sharply imaged on the photosensitive electrode so that there is maximum modulation of each of the encoded color signals. In the case of the cyan-transparent grid of the encoding filter described by Macovski, for example, it is desirable that the light passing through the transparent strips does not impinge upon those areas of the photosensitive electrode located behind the cyan strips in order that only the presence or absence of red light modulates the carrier signal derived from the vidicon as the electron beam scans those areas of the photosensitive electrode. The gratings will be sharply imaged on the photosensitive electrode if the light rays passing through the encoding filter strips are parallel or nearly parallel. If the camera lens is stopped down to a relatively small aperture, *f*22 or *f*32, for example, the light rays passing therethrough will be substantially parallel and the encoding filter strips will be sharply imaged on the photocathode. However, frequently it is desirable to increase the aperture size of the camera lens to obtain sufficient illumination or to achieve other effects. At large camera lens aperture sizes such as *f*4.5, for example, the rays of light passing through the lens will not be parallel and the encoding filter strips will not be imaged sharply onto the photosensitive electrode, resulting in a loss of modulation of the encoded colors as previously described.

In the past, one approach to imaging the encoding filter strips onto the photosensitive electrode of the pickup tube has been to insert a relay lens in the optical path between the color encoding filter and the photosensitive electrode. In such an arrangement, the scene is imaged onto the color-encoding filter and the relay lens serves to reimage the combination of the scene plus the encoding filter strips onto the photosensitive surface of the camera pickup tube. Thus, in a camera utilizing a relay lens to focus the encoding filter strips it is necessary that the encoding filter be in an image plane. Hence, any dust on the filter and any defect of the filter would be in focus at the photosensitive surface and usually undesirably appear in the televised scene. Also, a relay lens adds to the cost, size and weight of the optical system used with a camera.

In a shadowing system of a type described in U.S. Pat. No. 2,733,291 to R. D. Kell, a shadowing grating having strips of primary colors and a separate transparent area for passing the luminance signal is disposed in the optical path ahead of (i.e., between the subject and) a color encoding filter having strips of subtractive primary colors. The use of such a shadowing grating permits a given primary color to be encoded only over a portion of the total filter area, resulting in decreased light transmission efficiency, and the separate transparent area of the shadowing grating permits the luminance signal to appear over the entire encoding filter, thereby reducing the modulation of the separate primary color signals. Also, the fine color encoding grating must have a strip density high enough to resolve a scene into a minimum number of elements.

A shadowing arrangement using coarse and fine color encoding gratings and a fine phase or density grating in a shadowing arrangement is described in a copending application Ser. No. 798,677 filed concurrently herewith and entitled, "Shadowing System For A Color Encoding Camera." In that application it is described how the two gratings in a shadowing arrangement form a color encoding pattern on the photosensitive surface of a pickup tube without the use of a relay lens. In such an arrangement, the strips of the coarse color encoding grating act as an effective lens aperture to limit the angle of the light rays passing therethrough so that the fine grating may be shadowed onto the photosensitive electrode. In such an arrangement utilizing a density grating as the fine grating there is some loss of light efficiency because the opaque strips of the density grating do not pass any light. Likewise, if the fine grating is made a color encoding grating the colored strips of that fine grating will also absorb some light and thereby somewhat decrease the light transmission efficiency of the shadowing arrangement.

An object of this invention is to provide an imaging system for a color encoding camera which permits an encoding filter pattern to be imaged onto a photosensitive medium by a lens array without the necessity of a relay lens so as to provide high light efficiency.

In a color encoding camera including a photosensitive medium onto which a color encoding filter pattern is to be imaged apparatus is provided for imaging a color encoding filter having relatively wide pitch strips onto the photosensitive medium by use of a lens array having columns of lens elements disposed parallel to the encoding filter strips and being disposed in a collimating relationship between the encoding filter and the photosensitive medium, whereby the encoding filter pattern imaged onto the photosensitive medium has a pitch determined by the respective pitches of the color encoding filter and the lens elements of the lens array.

The invention is more fully described in the following specification taken in conjunction with the accompanying drawing of which:

DESCRIPTION OF THE INVENTION

Figure 1:
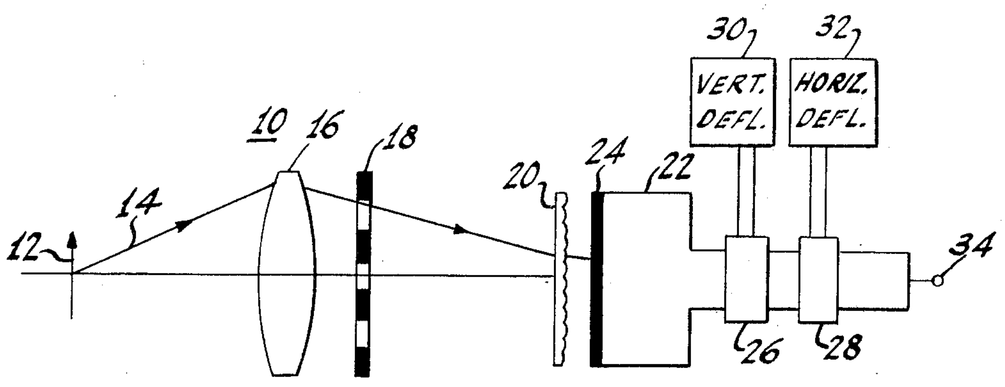
FIG. 1 shows that portion of a color television camera including a color encoding filter and a lens array forming an imaging system according to the invention necessary for an understanding of the invention.

FIG. 1 shows a color television camera utilizing a color encoding filter and a lens array in an imaging arrangement utilized to image a color encoding filter pattern onto a photosensitive electrode of an image pickup tube.

Light rays 14 from an object 12 to be televised pass through a camera objective lens 16, a color encoding strip filter 18 and a lens array 20 to form an image on a photosensitive electrode 24 of an image pickup tube 22. A source of vertical deflection waveforms 30 is coupled to a vertical deflection coil 26 and a source of horizontal deflection waveforms 32 is coupled to a horizontal deflection coil 28 to cause an electron beam of image pickup tube 22 to scan the photosensitive electrode 24, forming a rectangular raster. Output signals are derived at output terminal 34 of the image pickup tube 22 as the electron beam scans the raster. Image pickup tube 22 may be a vidicon, for example. The various electrodes of the pickup tube are understood to be connected to suitable sources of operating potential in a conventional manner.

Figure 2:
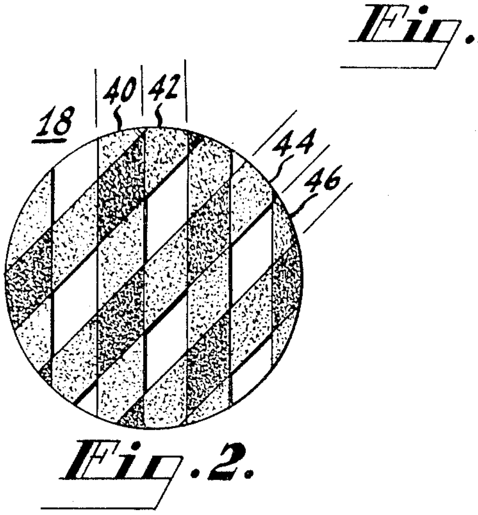
FIG. 2 illustrates a color encoding strip filter which may be used in the embodiment shown in FIG. 1.

In operation, light rays 14 from an object 12 to be televised pass through camera objective lens 16 and color encoding filter 18 and are imaged onto photosensitive electrode 24. Color encoding filter 18 may be of a type described in the previously mentioned Macovski patent. A filter of this type is illustrated in FIG. 2. Shown in FIG. 2 is a color encoding filter 18 having a first grating of alternate cyan strips 40 and transparent strips 42, over which is superimposed a second grating having alternate yellow strips 44 and transparent strips 46. The strips may be of equal width in both gratings. The cyan strips block red light and pass green and blue light. The yellow strips 44 block blue light and pass red and green light. The first grating comprising cyan and transparent strips is used to encode red light and the second grating comprising yellow and transparent strips is used to encode blue light. Because the respective colored strips block only one primary color and pass the other two primary colors, the encoding of one color by one grating does not interfere with the encoding of the other color by the other grating.

The encoded color signals will be derived from the output electrode 34 of image pickup tube 22 as sidebands of a carrier waveform, the frequency of which is determined by the number of line pairs of colored and transparent strips transversed by the scanning electron beam over a given area of the photosensitive electrode 24 in one scanning period. It can be seen that a higher carrier frequency will result from scanning of the vertically disposed strips which are normal to the scanning direction of the electron beam, and a lower carrier frequency will be derived from the scanning of the diagonally disposed strips. Thus, if the red encoding strips were disposed vertically, the red color information would be represented by the amplitude modulation of the sidebands of the higher frequency carrier wave and the blue color information would be represented by the amplitude modulation of the sidebands of the lower frequency carrier wave. The luminance or brightness component is contained in the average transmission of both gratings. The encoded color and luminance signals derived at output terminal 34 of image pickup tube 22 may be coupled to a processing network such as described in the previously mentioned Macovski patent, for example, where the signals are separated by band-pass filters and combined in a manner to yield a luminance signal and R–Y and B–Y color difference signals.

Figure 3:
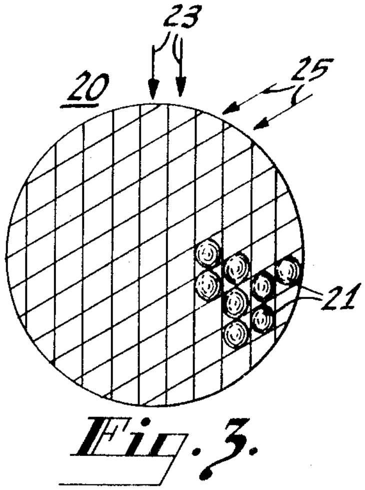
FIG. 3 illustrates a lens array which may be used in the embodiment shown in FIG. 1.

The light rays pass through the encoding filter 18 and impinge upon a lens array 20. FIG. 3 illustrates such a lens array. Arrows 23 indicate columns containing a plurality of lens elements 21 disposed in vertical columns and arrows 25 indicate rows containing a plurality of lens elements 21 disposed in rows at some angle to the columns 23. Thus, the lens elements 21 form a parallelogram lens array. The angle between the vertical lens columns 23 and the diagonal lens rows 25 is equal to the angle between the strips of the respective cyan-transparent and yellow-transparent gratings of color encoding filter 18. The pitch of the columns and rows of lens elements 21 of lens array 20 is made less than the pitch of the strips of encoding filter 18. The specific relationship between the pitches of the lens array and the encoding filter will be described subsequently.

The combination of encoding filter 18 and lens array 20 comprises an imaging arrangement whereby each lens element 21 of the lens array 20 forms an image of the strip pattern of encoding filter 18 on the photosensitive electrode 24 of image pickup tube 22.

Figure 4:
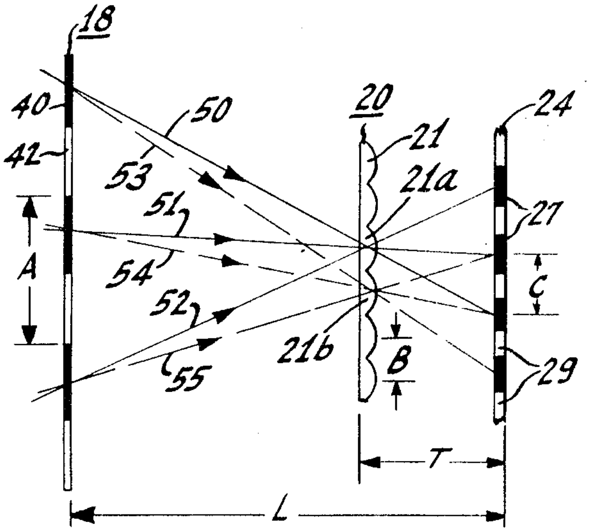
FIG. 4 illustrates a color encoding grating and a lens array in a shadowing arrangement according to the invention.

Referring to FIG. 4, an imaging arrangement utilizing a coarse color encoding grating and a lens array is illustrated. The coarse color encoding grating 18, for the purpose of describing the invention, is the cyan-transparent grating of color encoding filter 18 shown in FIGS. 1 and 2. As previously mentioned, the cyan-transparent and yellow-transparent gratings do not interfere with each other so only the effect of the cyan-transparent grating in the imaging arrangement will be described in connection with FIG. 4. It is to be understood that the operation of the yellow-transparent grating in the imaging arrangement is similar.

Color encoding filter 18 comprising cyan strips 40 and transparent strips 42 is disposed a distance $L$ from photosensitive surface 24 of image pickup tube 22. Lens array 20 is disposed a distance $T$ from the photosensitive surface. The pitch of the strips of encoding filter 18 is $A$ and the pitch of the lens elements 21 of lens array 20 is $B$. In order for the encoding filter 18 and the lens array 20 to be in a collimating relationship with each other and with the photosensitive electrode 24, the following relationship must exist: $A/B=L/T$. With this collimating relationship the pitch of the color encoding strip pattern imaged onto the photosensitive surface 24 and indicated by $C$ is $1/C=1/B-1/A$. Therefore, it can be seen that the reciprocal of the pitch of the color encoding strip pattern at photosensitive surface 24 is equal to the difference between the respective reciprocals of the pitches of the lens array 20 and color encoding filter 18. That is, the frequency of a signal produced by scanning the color encoding strip pattern at photosensitive surface 24 is proportional to the difference between the line "frequencies" (i.e., reciprocal of pitch) of the lens array 20 and color encoding filter. This arrangement enables the color encoding filter to be made having relatively wide strips which results in a filter which is easier to manufacture and which is less costly than an encoding filter which would have a much higher strip density. Also, with a smaller number of strips for a given filter there is less likelihood of numerous defects in the filter.

In a 4 rays of light indicated by the solid lines 50, 51, and 52 are shown passing through three of the cyan strips 40 of encoding filter 18 and a single lens element 21*a* of lens array 20. Lens element 21*a* thus forms an image of substantially the entire color encoding filter 18 on the photosensitive surface 24. The imaged cyan strips are represented by the shaded areas 27 and the imaged transparent strips are represented by the areas 29 on photosensitive electrode 24. Rays of light indicated by the dashed lines 53, 54 and 55 also pass through the cyan strips 40 of encoding filter 18 and through lens element 21*b* of lens array 20. Lens element 21*b* thus also forms an image of encoding filter 18 on the photosensitive surface 24. It can be seen that each individual lens element 21 of the lens array 20 forms an image of the encoding filter pattern on the photosensitive electrode 24, the images from the respective lens elements being superimposed on the photosensitive electrode.

Thus, even if there were some defects or dust on an individual lens element, or even if a lens element were missing there would be little adverse effect on the encoding filter pattern shadowed on the photosensitive surface 24 because of the many superimposed images created by all of the lens elements 21 of lens array 20. The use of lens array 20 results in an imaging system having greater light transmission efficiency that if a fine pitch color encoding grating or density grating were used as described in the above-mentioned copending application. This results from the fact that the entire area of lens array 20 transmits light and there is no absorption of light as is the case of a color encoding filter or a density grating.

Lens array 20 may be fabricated using well-known photographic techniques. For example, a suitable parallelogram lens array may be formed by exposing film through two superimposed and angularly disposed density gratings such as are well known in the art. The exposure of the film through the crossed density gratings will result in a density variation on the film which also gives some thickness variation when the film is developed. The film may then be bleached to remove the density variations leaving only the thickness variations which then form a lens array according to the invention. Each lens element formed in the manner described above will be in the form of a parallelogram. In the case of two density gratings crossed at 45° to each other the lens elements will be rhombic.

Another advantage of the parallelogram lens array is that the pattern formed by the lens elements may have its columns and rows of lens elements at any given angle to each other depending on the angle of the color encoding strips of the color encoding gratings which the lens array is to image onto the photosensitive surface. In the case of the commonly known lenticular arrays, each containing parallel rows of cylindrical lenses, two of these arrays may be superimposed and used effectively only when the two arrays are at right angles to each other. If the lenticular arrays were disposed at other than right angles to each other, the resultant image produced by them would be highly astigmatic. Thus, while the lens array described has its rows of lenses angularly disposed 45° from each other to correspond to the 45° angle of the two superimposed gratings of the color encoding filter described in the Macovski patent, it should be noted that the lens array will work equally well with the columns and rows of lenses forming any desired angle with each other.

The imaging arrangement described utilizing a lens array may sharply image a color encoding strip filter pattern only a photosensitive surface. The sharp imaging of the strips results in maximum modulation of the encoded color signals, which signals contribute to a true reproduction of the televised object.

The described embodiment utilizes an encoding filter having superimposed gratings angularly disposed from each other. However, the lens array may be constructed to be operable with any strip encoding filter including those having only parallel encoding strips of different transmission characteristics. Similarly, a single lens array may be utilized to image two separate encoding filters onto a photosensitive surface as long as each encoding filter is in a collimating relationship with the lens array and the photosensitive surface. In this manner, several encoding gratings having different spatial frequencies may be imaged simultaneously by a single lens array.

The described imaging arrangement of the invention may also be utilized with a film camera. In such an arrangement a panchromatic film would be the photosensitive surface onto which the component colors of an object would be encoded.

I claim:

1. In a color encoding camera including a photosensitive medium, a color encoding filter arrangement and a lens system for projecting light from a scene through said filter arrangement onto said photosensitive medium, apparatus for imaging a color encoding filter pattern onto said photosensitive medium whereby light from said scene is separated into light of different spectral ranges according to said color encoding filter pattern comprising:

color encoding filter means including a first grating having alternate strips of material for passing light of first and second spectral ranges and a second grating superimposed on said first grating and having alternate strips of material for passing light of first and third spectral ranges, said strips of said second grating being angularly disposed from the strips of said first grating and disposed in the optical path between said lens system and said photosensitive medium; and lens array means disposed between said color encoding filter and said photosensitive medium, said lens array means comprising a pattern of individual lenses contiguous with each other and forming rows of lenses parallel to the strips of both of said gratings and having a relatively fine pitch in comparison to said strips, said color encoding filter and said lens array means being in collimating relationship for forming an image on said photosensitive medium of said color encoding filter pattern having a pitch determined by the respective pitches of said encoding filter and said lens array means.

2. In a color encoding camera, imaging apparatus according to claim 1 wherein said camera is a color encoding television camera and said photosensitive medium is a photosensitive electrode of an image pickup device.

3. In a color encoding camera, imaging apparatus according to claim 2 wherein said strips of said first grating are alternate strips of transparent and cyan light-passing material and said strips of said second grating are alternate strips of transparent and yellow light-passing material.

4. In a color encoding camera, imaging apparatus according to claim 3 wherein said lens elements are rhombic-shaped.

5. In a color encoding camera, imaging apparatus according to claim 1 wherein said camera is a color encoding film camera and said photosensitive medium is panchromatic film.